United States Patent Office 2,739,043
Patented Mar. 20, 1956

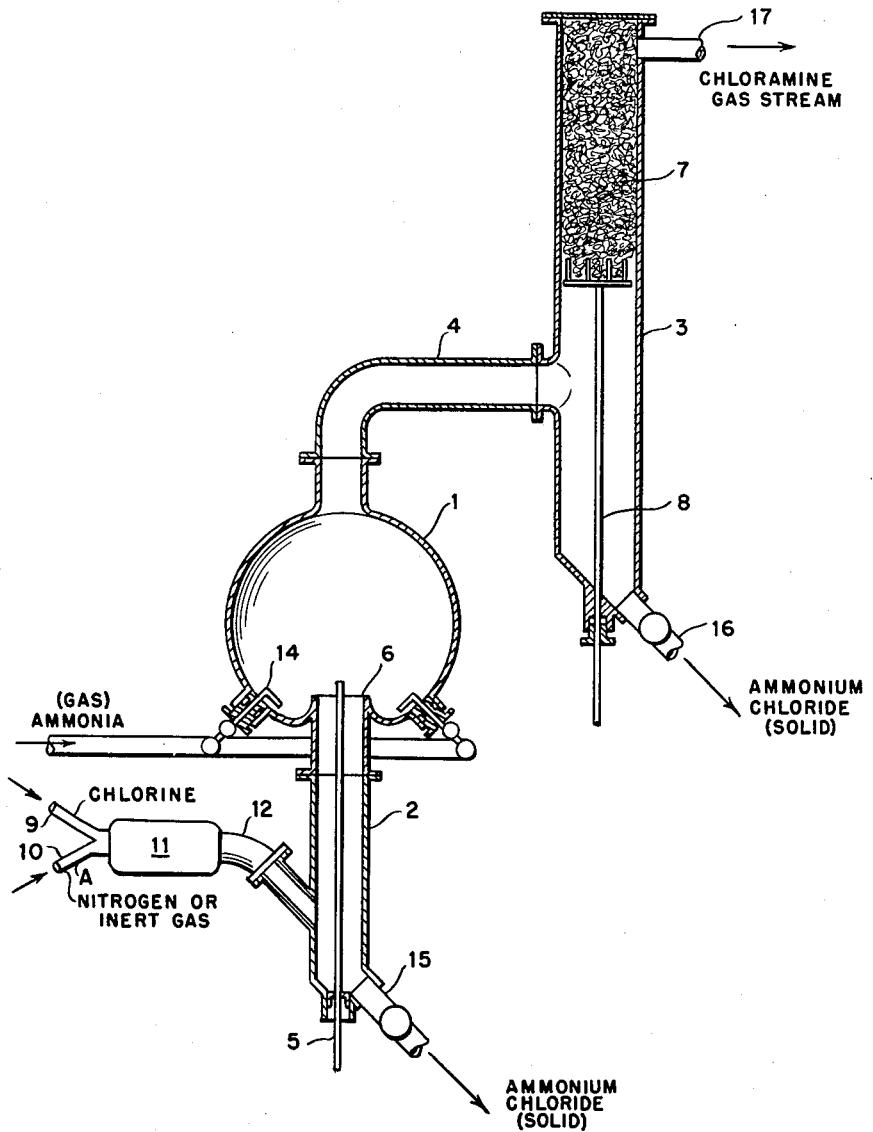

2,739,043

CHAMBER REACTOR

Theodore H. Dexter, Niagara Falls, N. Y., assignor to Olin Mathieson Chemical Corporation, a corporation of Virginia Application August 21, 1951, Serial No. 242,856

4 Claims. (Cl. 23—260)

My invention relates to the manufacture of anhydrous monochloroamine. More particularly it relates to apparatus for the manufacture of monochloroamine by direct reaction of ammonia and chlorine in gas phase. Application Serial No. 242,979, filed August 21, 1951, by John F. Haller and myself describes a two stage process for the manufacture of anhydrous hydrazine by the direct reaction of chlorine and excess ammonia to form monochloroamine in a first reaction stage and a subsequent reaction of the monochloroamine with excess ammonia to produce anhydrous hydrazine in a second reaction stage. Chlorine and ammonia are reacted in gas stream to produce monochloroamine in such proportions that the molar ratio of ammonia to chlorine is at least 10:1, and the reaction temperature is limited to about 100° C. to avoid decomposition of monochloroamine, advantageously by employing nitrogen or other inert gas as a diluent for the chlorine. Advantageously the molar ratio of ammonia to chlorine is about 20 to 40:1 and of nitrogen to chlorine is not less than about 5:1.

When chlorine and excess ammonia are admixed in the gaseous state, copious and voluminous amounts of solid ammonium chloride are formed and very high temperatures are produced. Ammonium chloride at these temperatures appears to decompose monochloroamine and thus the yield of the desired product obtained by direct admixture of the two gases is negligible. Diluting the chlorine with nitrogen or other inert gas prior to its admixture with excess ammonia provides a particularly convenient means for controlling the reaction temperature. However deposition of ammonium chloride within the reaction chamber and especially around the ammonia and chlorine gas inlets with resulting clogging of those inlets may cause termination of the reaction. Dilution of the chlorine gas with nitrogen effectively controls the temperature of the ammonia-chlorine reaction to prevent the decomposition of monochloroamine but ordinarily additional provision must be made for the removal of the voluminous amounts of ammonium chloride from the reaction chamber in order to maintain continuous reaction and obtain satisfactory yields. The apparatus of my invention provides for continuous removal of a large proportion of the solid ammonium chloride from the reaction chamber as a suspension in the gaseous mixture leaving that chamber and for the continuous separation of the suspended ammonium chloride from that gaseous mixture. The apparatus of my invention comprises a mushroom shaped reactor having an enlarged upper reaction chamber and a lower stem of restricted cross-section depending therefrom, means for introducing chlorine diluted with nitrogen or other inert gas into the lower portion of the stem of the mushroom shaped reactor, means situated in the lower section of the upper reaction chamber for introducing one or more ammonia streams in such a manner that the ammonia flow is directed across the rim created by the juncture of the reaction chamber and the stem depending therefrom, means for dislodging ammonium chloride formed inwardly in a ring on the rim so that it falls to the base of the stem, means for removing ammonium chloride collecting in the base of the stem, and overhead means from the reaction chamber for removing the gaseous mixture containing gaseous reaction products and suspended ammonium chloride. The overhead gas stream containing suspended ammonium chloride removed from the reaction chamber is advantageously passed by means of a conduit to an inverted filter chamber containing a flexible filter element for removing suspended ammonium chloride from the overhead gas stream, means for flexing the filter medium to dislodge the ammonium chloride so that it falls to the bottom of the inverted filter chamber, means for removing ammonium chloride from the bottom of the inverted filter chamber, and means for withdrawing from the inverted filter chamber the gaseous mixture containing the gaseous reaction products substantially free of ammonium chloride. Advantageously the means for introducing chlorine diluted with nitrogen comprises an inlet pipe discharging at a downwardly disposed angle in the depending stem. Also the cross-section of the depending stem advantageously should be restricted so that mixing of the diluted chlorine with ammonia does not occur in the stem.

I will describe the construction and operation of my apparatus for the manufacture of anhydrous monochloroamine, by way of further illustration, with reference to the accompanying drawing.

The apparatus comprises essentially a mushroom shaped reactor having an enlarged upper reaction chamber 1 and a lower stem 2 depending therefrom and inverted filter 3 connected to reaction chamber 1 by overhead conduit 4. Ammonium chloride dislodging means 5, advantageously a ceramic or glass rod extending upwardly through reaction stem 2, is provided so that the rim of contact 6 between the gases at the juncture of the stem 2 and the reaction chamber 1 may be conveniently reached. Inverted filter 3 contains a porous plug of an inert fibrous flexible filter medium 7 such as glass cloth, glass wool, or asbestos. The filter medium is supported in part by friction and in part by mechanical means such as fork 8 rotatably arranged so that the filter medium and the ammonium chloride cake which forms on its surface may be flexed continuously or intermittently to dislodge the cake. In operation, chlorine gas is introduced through line 9 and nitrogen, air, or other inert gas is introduced through line 10 to mixing chamber 11. The resulting mixed gas stream is introduced by means of inlet tube 12 into the lower portion of reactor stem 2 allowing space in reactor stem 2 below inlet tube 12 for the accumulation of ammonium chloride. Inlet tube 12 may enter the reactor stem 2 horizontally, but advantageously enters downwardly as shown and should not enter upwardly in order to avoid its clogging with ammonium chloride. The chlorine-nitrogen admixture flows upwardly through the reactor stem 2 into the reaction chamber 1. Reactor stem 2 must be of such restricted cross-section that mixing of the diluted chlorine with ammonia does not occur in reactor stem 2 for any given rate of introduction of diluted chlorine. Ammonia gas is introduced into the reaction chamber 1 by means of advantageously a plurality of tubes 14 directed towards the bottom and center of the reaction chamber 1. At the rim of contact 6 between the ammonia and diluted chlorine gas streams, ammonium chloride is formed inwardly in a ring which is frequently broken by means of dislodger 5. The dislodged ammonium chloride deposit falls to the bottom of the reactor stem 2 and is effectively removed through line 15. Thus the force of the stream of ammonia gas flowing across the rim of contact 6 together with that of the stream of diluted chlorine gas entering reaction chamber 1 carries most of the reaction products upwardly away from any surface and minimizes the ammonium chloride deposition in reaction chamber 1. The gaseous mixture composed of the inert gas, ammonia, and gaseous reaction products then circulates downwardly around the outer surface of reaction chamber 1 and finally leaves from the top of reaction chamber 1 carrying most of the ammonium chloride suspended therein. The gas stream passes from the reaction chamber 1 to inverted filter chamber 3 by means of conduit 4, enters below the porous plug of filter medium 7 and flows upwardly through the inverted filter chamber depositing the suspended ammonium chloride on the filter medium in the form of a cake. Fork 8 is flexed continuously or intermittently to dislodge the ammonium chloride cake from the filter medium and the ammonium chloride so dislodged falls to the bottom of inverted filter 3 where it is removed through line 16. The filtered gas stream is withdrawn from inverted filter 3 substantially free of suspended ammonium chloride by means of line 17. Alternatively a plurality of filters may be provided arranged in parallel so that one can be cleaned while the other is in use.

I claim:

1. Apparatus for the manufacture of anhydrous monochloroamine by direct reaction of ammonia gas and chlorine gas diluted with an inert gas which comprises a mushroom shaped reactor having an enlarged upper reaction chamber and a lower hollow stem depending therefrom, said stem being of restricted cross-section at its juncture with the upper reaction chamber as compared to the major horizontal cross-section of the upper reaction chamber, a rim at said juncture, means for introducing chlorine diluted with an inert gas into the lower portion of the stem of the mushroom shaped reactor, means situated in the lower section of the upper reaction chamber for introducing at least one ammonia stream in such a manner that the flow is directed across the rim created by the juncture of the reaction chamber and the stem depending therefrom, means for dislodging ammonium chloride formed inwardly in a ring on the rim so that it falls to the base of the stem, means for removing ammonium chloride collecting in the base of the stem, and overhead means from the reaction chamber for removing the gaseous mixture containing gaseous reaction products and suspended ammonium chloride.

2. Apparatus for the manufacture of anhydrous monochloroamine by direct reaction of ammonia gas and chlorine gas diluted with an inert gas which comprises a mushroom shaped reactor having an enlarged upper reaction chamber and a lower hollow stem depending therefrom, said stem being of restricted cross-section at its juncture with the upper reaction chamber as compared to the major horizontal cross-section of the upper reaction chamber, a rim at said juncture, means for introducing chlorine diluted with an inert gas into the lower portion of the stem of the mushroom shaped reactor, means situated in the lower section of the upper reaction chamber for introducing a plurality of ammonia streams in such a manner that the flow is directed across the rim created by the juncture of the reaction chamber and the stem depending therefrom, means for dislodging ammonium chloride formed inwardly in a ring on the rim so that it falls to the base of the stem, means for removing ammonium chloride collecting in the base of the stem, overhead means from the reaction chamber to an inverted filter chamber containing a flexible filter element capable of removing suspended ammonium chloride from the overhead gas stream, means for flexing the filter element to dislodge ammonium chloride so that it falls to the bottom of the inverted filter chamber, means for removing ammonium chloride from the bottom of the inverted filter chamber, and means for withdrawing from the inverted filter chamber the gaseous mixture containing the reaction products substantially free of ammonium chloride.

3. Apparatus for the manufacture of anhydrous monochloroamine by direct reaction of ammonia gas and chlorine gas diluted with an inert gas which comprises a mushroom shaped reactor having an enlarged upper reaction chamber and a lower hollow stem depending therefrom of such restricted cross-section at the juncture of the upper reaction chamber and the stem as compared to the major horizontal cross-section of the upper reaction chamber that reaction of diluted chlorine with ammonia does not occur in the stem, a rim at said juncture, means for introducing chlorine diluted with an inert gas downwardly into the lower portion of the stem of the mushroom shaped reactor, means situated in the lower section of the upper reaction chamber for introducing a plurality of ammonia streams in such a manner that the flow is directed across the rim created by the juncture of the reaction chamber and the stem depending therefrom, means for dislodging ammonium chloride formed inwardly in a ring on the rim so that it falls to the base of the stem, means for removing ammonium chloride collecting in the base of the stem, overhead means from the reaction chamber to an inverted filter chamber containing a flexible filter element capable of removing suspended ammonium chloride from the overhead gas stream, means for flexing the filter element to dislodge ammonium chloride so that it falls to the bottom of the inverted filter chamber, means for removing ammonium chloride from the bottom of the inverted chamber, and means for withdrawing from the inverted filter chamber the gaseous mixture containing the gaseous reaction products substantially free of ammonium chloride.

4. Apparatus for the manufacture of anhydrous monochloroamine by direct reaction of ammonia gas and chlorine gas diluted with an inert gas which comprises a reactor having an enlarged upper reaction chamber with a rounded side and having a lower hollow stem having an open upper end of cross-section smaller than the major horizontal cross-section of the upper reaction chamber, said stem depending from the upper reaction chamber and opening into the chamber, said stem and upper reaction chamber forming a rim at their juncture, said rim projecting inwardly into the upper reaction chamber, means for introducing chlorine diluted with an inert gas into the lower portion of the stem, means situated in the lower section of the upper reaction chamber for introducing at least one ammonia stream in such a manner that the flow is directed across said rim, means for dislodging ammonium chloride formed inwardly in a ring on said rim so that it falls to the base of the stem, means for removing ammonium chloride collecting in the base of the stem, and overhead means from the reaction chamber for removing the gaseous mixture containing gaseous reaction products and suspended ammonium chloride.

References Cited in the file of this patent

UNITED STATES PATENTS

| | | |
|---|---|---|
| 920,335 | Hughes | May 4, 1909 |
| 1,644,518 | Field | Oct. 4, 1927 |
| 1,900,667 | Raffloer | Mar. 7, 1933 |
| 2,547,409 | Prescott | Apr. 3, 1951 |